United States Patent [19]

Juday

[11] Patent Number: 5,416,159
[45] Date of Patent: May 16, 1995

[54] POLYMERIZABLE LIQUID SEALANTS FOR IMPREGNATING CAST METAL AND POWDERED ARTICLES

[75] Inventor: Thomas W. Juday, Elm Grove, Wis.

[73] Assignee: Imprex, Inc., Milwaukee, Wis.

[21] Appl. No.: 79,431

[22] Filed: Jun. 16, 1993

[51] Int. Cl.$^6$ ............................................. C08L 67/06
[52] U.S. Cl. ...................................... 525/44; 525/48; 427/388.2
[58] Field of Search ........................................ 525/44

[56] References Cited

U.S. PATENT DOCUMENTS

| | | | |
|---|---|---|---|
| Re. 32,240 | 9/1986 | DeMarco | 526/328 |
| 2,772,185 | 11/1956 | Dempster | 117/102 |
| 3,672,942 | 7/1972 | Neumann et al. | 117/62.2 |
| 3,969,552 | 7/1976 | Malofsky et al. | 427/295 |
| 4,147,821 | 4/1979 | Young | 427/295 |
| 4,165,400 | 8/1979 | DeMarco | 427/295 |
| 4,416,921 | 11/1983 | Dunn | 427/353 |
| 4,479,986 | 10/1984 | Juday | 427/295 |
| 4,632,945 | 12/1986 | Garcia et al. | 523/176 |
| 5,098,743 | 3/1992 | Juday | 427/295 |
| 5,212,233 | 5/1993 | Juday | 525/36 |

FOREIGN PATENT DOCUMENTS

| | | |
|---|---|---|
| 1297103 | 11/1972 | United Kingdom . |
| 1308947 | 3/1973 | United Kingdom . |
| 1547801 | 6/1979 | United Kingdom . |
| 2072231 | 9/1981 | United Kingdom . |
| 2153863 | 8/1985 | United Kingdom . |
| 2198737 | 6/1988 | United Kingdom . |
| 2201156 | 8/1988 | United Kingdom . |

Primary Examiner—Patricia A. Short
Attorney, Agent, or Firm—Quarles & Brady

[57] ABSTRACT

Thermally curable liquid sealants for impregnating the pores of cast metal articles and powdered metal articles consist of a combination of polymerizable components including at least about 15% by weight of a water emulsifiable unsaturated polyester and no more than 20% of a monofunctional methacrylate or acrylate monomer. The sealants when cured, have low weight loss when tested for heat resistance, acceptable weight gain or loss when tested for chemical resistance upon submersion in water, brake fluid, antifreeze and methanol alcohol.

2 Claims, No Drawings

POLYMERIZABLE LIQUID SEALANTS FOR IMPREGNATING CAST METAL AND POWDERED ARTICLES

FIELD OF THE INVENTION

This invention relates to new compositions of polymerizable liquid sealants for use in impregnating and sealing pores in cast metal and powdered metal articles.

BACKGROUND ART

Many types of metal articles or components, such as engine blocks, heads, oil and water pumps, brake cylinders, carburetors, transmission cases, etc., are manufactured by casting various metals or alloys, e.g. cast iron, aluminum, brass, magnesium, bronze, etc. Metal articles also are made by powdered metal techniques, in which metal powder is pressed in suitably shaped molds and then sintered at an elevated temperature to consolidate the structure, reduce porosity and impart useful strength; since this is essentially a solid diffusion process, a very high degree of dimensional accuracy is possible and large numbers of parts can be economically produced. A few examples of powdered metal articles are hydraulic pump components, gears, cams, bearings, injector bodies, levers and automotive trim.

With any of the metal casting and powdered metal processes in general use, it is typical for a varying proportion of cast articles and all powdered metal articles to have pores that extend through or partially through a wall of the articles. Because these pores can impair the usefulness of the article, such as by resulting in gaseous or fluid leakage, or preventing normal plating operations, the art of impregnating metal articles to fill the pores has developed in order that the articles can be made useful for their intended purpose.

The most effective technology for impregnation of metal articles is the "dry vacuum-pressure" method in which metal articles are placed in a closed vessel and the vessel is subjected to a vacuum (such as 2 to 10 Torr for 10 to 15 minutes) to cause air entrapped in any pores in the dry articles to escape. Liquid sealant is drawn from a reservoir into the vessel so as to cover and fill the pores of the article. The vacuum is then released and pressure is applied to the liquid sealant level (such as air at 100 psi for 10 to 15 minutes) to drive the sealant further into the pores. Following this, the excess sealant is drained, the parts rinsed, and the sealant is polymerized, i.e. cured, to fill the pores with solid material.

Another impregnation method is a "dry vacuum" process in which metal articles are placed in a closed vessel and the vessel is subjected to a vacuum (e.g. 2 to 10 Torr for 10 to 15 minutes) to cause air entrapped in any pores in the articles to escape. The articles are then submerged in or flooded by liquid sealant, so as to cover the articles and fill the pores and allowed to "soak" for 10 to 15 minutes at atmospheric pressure, following which excess sealant is drained, the articles are rinsed and the sealant is polymerized to fill the pores with solid material. An efficient dry vacuum apparatus is described in my U.S. Pat. No. 4,479,986, issued Oct. 30, 1984, the disclosure of which is incorporated herein for a more detailed description of a dry vacuum impregnation process.

Another commonly practiced technology for impregnation of metal articles is the so-called "wet vacuum" process that includes the steps of submerging the articles in a bath of liquid sealant in an enclosed impregnation tank, and then evacuating the tank to a sufficiently low vacuum (e.g. 2 to 10 Torr for 10 to 15 minutes) to enable most of the air entrapped in pores in the articles to escape so that the pores can be filled with liquid sealant. The vacuum in the impregnating tank is then released and the articles are transferred to a tank in which the excess sealant is allowed to drain off. The articles are transferred to another tank in which they are rinsed with water and/or detergent in order to wash off excess sealant. Next, the articles are transferred to a curing tank to allow the sealant to polymerize or cure to a solid material to fill the pores.

Liquid polymerizable sealants that have been proposed or commercialized to date fall into two broad classes, heat curable sealants that polymerize in the presence of air or oxygen and anaerobic sealants that polymerize in the absence of oxygen. The following lists representative patents disclosing heat curable sealants that polymerize in the presence of oxygen and summarizes their principal ingredient(s).

(1) U.S. Pat No. 2,772,185 Unsaturated polyester with cooked-in emulsifier mixed with vinyl monomer, e.g. 71% polyester and 29% styrene.

(2) U.K. 1,308,947 Methacrylic or acrylic monomer heated in absence of polymerization catalyst.

(3) U.S. Pat. No. 4,147,821 Monofunctional (meth)acrylic monomer, polyfunctional monomer (typically polyfunctional methacrylate), catalyst and inhibitor.

(4) U.S. Pat. No. 4,416,921 Acrylic monomer, azonitrile, substituted phenol and metal ion chelator.

Anaerobic liquid sealants for metal articles have been promoted primarily by Loctite Corporation, and the following lists some of their patents relating to anaerobic sealants and summarizes their principal ingredient(s).

(5) U.K. 1,297,103 Acrylate or methacrylate monomer and redox imitator.

(6) U.S. Pat No. 3,672,942 Monofunctional or polyfunctional acrylate and/or methacrylate monomers and free-radical imitator; washed with solvent solution of polymerization accelerator.

(7) U.S. Pat. No. 3,969,552 Composition same or similar to 3,672,942; washed with aqueous nonionic surfactant solution.

(8) U.S. Pat. No. 4,069,378 (now U.S. Pat. No. Re. 32,240) Composition same or similar to U.S. Pat. No. 3,672,942; sealant contains anionic or nonionic surfactant to be self-emulsifying when mixed with water.

(9) U.S. Pat. No. 4,165,400 Same sealant composition disclosure as U.S. Pat. No. 4,069,378

(10) U.S. Pat. No. 4,632,945 Monofunctional or polyfunctional acrylate and/or methacrylate monomers, peroxy imitator, organic accelerator such as saccharin, and copper and iron compounds as co-accelerators.

Anaerobic liquid sealants for metal articles are commercially available at the present time, some of which are formulated in accordance with one or more of patents (5)–(10) above. However, as noted in U.S. Pat. No. 4,416,921, patent (4) above, anaerobic sealants present problems since they must be supplied in two parts, one containing a catalytic polymerization accelerator that is to be added to the other part before use. The resulting mixture is liable to undergo premature polymerization, such as by contact with transition metals, and must be constantly aerated in order to prevent this. The tendency towards premature polymerization, the need for aeration, and their two-part nature are said in the patent to represent drawbacks to the use of anaerobic liquid sealant compositions.

In view of the above and other disadvantageous characteristics of anaerobic liquid sealants, heat curable or thermosetting compositions are the predominant sealants of choice for almost all cast metal articles and many powdered metal articles as well. Heat curable sealants may be cured with hot water, oil, electric heating elements, hot air, etc., curing is most often practiced by submerging the impregnated articles in hot water in a suitable tank.

As noted in U.S. Pat. No. 2,772,185, (1) above, and U.K. Patent 1,308,947, (2) above, some of the early heat curable sealants consisted of unsaturated polyester mixed with a polymerizable monomer such as styrene, but these compositions presented problems such as high viscosity and the necessity to wash with solvents that inhibited their use; also, the composition proposed by (1) above, is particularly difficult to produce since it proposes a polyester with a cooked-in emulsifier and monomer. The U.K. patent, (2) above, proposes a methacrylic or acrylic ester monomer or a mixture of such esters, as a sealant which is cured in the absence of a polymerization catalyst; the cure times described in the patent are quite long, one hour for curing being described in the patent. It is believed that the sealants described in these two patents cannot meet the requirements of current industry practice.

The assignee of this patent has for the past several years been selling a high performance liquid sealant for metal articles that exhibits vastly superior heat and chemical resistance. This sealant is a composition analyzed as containing 28% hydroxypropyl methacrylate, 28% triethylene glycol dimethacrylate, 15% unsaturated polyester and 28% dicyclopentenyloxyethyl methacrylate.

These types of sealants are of interest to end users since they can be cured at relatively low temperatures in relatively short time periods, such as by curing with hot water in a temperature range of about 85° C. to 90° C. for a period of about 4 minutes to 15 minutes. Rapid curing at moderate temperatures facilitates impregnation of metal articles and reduces the time required for processing the articles. However, these sealants, while adequate, do not provide all the high performance characteristics presently sought by many end users. Among the disadvantages of current commercial heat curable liquid sealants are (i) relatively high heat loss, often expressed as low heat resistance and (ii) relatively poor chemical resistance, particularly to fluids such as brake fluid, antifreeze solutions, water, and alcohols, such as methanol. There is, therefore, a need for a heat curable liquid sealant for cast metal and powdered metal articles that provides substantially greater heat and chemical resistance than currently available sealants, and this was the impetus for the development effort that culminated in the present invention.

A principal object of this invention is to disclose a heat curable liquid sealant for cast and powdered metal articles that provides improved heat resistance and chemical resistance as compared to presently available sealants. Another object is to disclose sealants with the foregoing advantages which retain the characteristic of being curable at moderate temperatures and relatively short time periods. Another object is to provide new heat curable liquid sealants that can be used to impregnate porous cast metal and powdered metal articles with impregnating apparatus and methods now in general use, i.e. that do not require special equipment, unusual or double processing steps. A further object is to provide new compositions for liquid sealants that can be readily formulated by a simple mixing of ingredients without employing reaction vessels or prolonged processing. Another object is to provide liquid sealants that have viscosities within a range suitable for effective impregnation of various metal articles. These and other objects will become apparent from the detailed description that follows.

SUMMARY OF THE INVENTION

The present invention provides compositions for heat curable liquid sealants for porous cast metal and powdered metal articles which comprise on a percent by weight basis:

(1) about 0% to no more than about 20% of a polymerizable monofunctional methacrylate or acrylate monomer, such as hydroxy propyl methacrylate;

(2) about 15% and up to about 40% of an alkylene glycol dimethacrylate, such as triethylene glycol dimethacrylate;

(3) about 10% to about 30% of a difunctional methacrylate, such as dicyclopentenyloxyethyl methacrylate or acrylate monomer;

(4) about 0% to about 25% of a polymerizable polyfunctional dimethacrylate or diacrylate ester of diethylene glycol or dipropylene glycol; and (5) about 15% to about 60% of a water emulsifiable unsaturated polyester.

The sealants of the present invention which differ from the prior art sealants in that they contain much higher percentages of the water emulsifiable unsaturated polyester exhibit acceptable weight loss when subjected to a heat resistance test as hereinafter defined and acceptable weight gains or losses when subjected to chemical resistance tests in water, brake fluid, methanol and antifreeze as hereinafter defined.

DESCRIPTION OF PREFERRED EMBODIMENTS (a) Description of Tests

The following description and the claims refer to certain tests regarding the performance of prior art liquid sealants for metal articles and the performance of the liquid sealants of this invention. The test procedures are defined below.

Heat loss is determined by forming a test body of polymerized sealant in the form of a cylindrical rod about 4.5 mm in diameter and about 25 mm long. A test body is weighed after being fully cured and aged for 24 hours, placed in an oven at 400° F. for 24 hours, and then weighed after removal from the oven. The test body will lose weight after being heated under these conditions, and the weight loss is expressed as a percentage of the original weight of the test body before being subjected to 400° F. temperature for 24 hours. Nine test bodies are tested in this manner, and the weight loss is calculated as an average of that exhibited by the nine test bodies. This test is referred to herein and in the claims as the Heat Resistance Test.

The chemical resistance of a sealant upon exposure to typical fluids is another important characteristic of a sealant. Chemical resistance is determined by forming a test body of polymerized sealant in the form of a cylindrical rod about 4.5 mm in diameter and about 25 mm long; and submerging the body in a test fluid for a period of 96 hours at room temperature. The test body will normally increase in weight by absorbing fluid during this test, although some sealants will partially dissolve in certain fluids so that a test body also may lose weight during this test. The test body is weighed before and after submersion in the test fluid and the weight change is expressed as a percentage (plus or minus) of its weight before submersion. Nine test bodies are submersed in each test fluid and the weight change is calculated as an average of that exhibited by the nine test bodies. The fluids employed for this test as reported in the next two sections of this description are as follows:

(1) Water (deionized water);
(2) Brake fluid, consisting of heavy duty DOT 3 (Gunk ®);
(3) Antifreeze, consisting of a solution of 50% Prestone ® antifreeze (ethylene glycol) and 50% water by weight;
(4) Methanol alcohol.

This test is referred to herein and in the claims as the Chemical Resistance Test.

(b) Prior art Sealants

Two commercially-available prior art sealants, one identified by its manufacturer as made under U.S. Pat. No. 4,147,821 (Sealant A below) and the other identified by its manufacturer as made under U.S. Pat. No. 4,416,921 (Sealant B below), were subjected to the Heat Resistance Test and the Chemical Resistance Test as described in part (a) with the results set forth below. Sealant A is believed to comprise hydroxy propyl methacrylate, 13.5% lauryl methacrylate, triethylene glycol dimethacrylate and 6.7% surfactant; Sealant B is believed to comprise essentially 99% polyethylene glycol dimethacrylate, with very small quantities such as 1 to 200 ppm each of a substituted phenol and a metal ion chelator.

| Sealant A (U.S. Pat. No. 4,147,821) | |
|---|---|
| Heat Resistance Test | 24.7% weight loss |
| Chemical Resistance Test | |
| (a) Water | 18.56% weight loss |
| (b) Brake fluid | 45.45% weight gain |
| (c) Antifreeze | 9.58% weight gain |
| Sealant B (U.S. Pat. No. 4,416,921) | |
| Heat Resistance Test | 29.51% weight loss |
| Chemical Resistance Test | |
| (a) Water | 6.74% weight gain |
| (b) Brake fluid | 11.25% weight gain |
| (c) Antifreeze | 10.52% weight gain |
| (d) Methanol alcohol | ~.3% weight loss |

The above commercial sealants have been and are being used to impregnate various types of metal articles. However, their heat resistance and chemical resistance as shown by the above data are sufficiently inadequate to preclude or inhibit their use for impregnating many types of metal articles that are subjected to rigorous heat conditions or particular fluids in applications that require better performance. As previously mentioned, the assignee of this patent has for the past several years been selling a high performance liquid sealant for metal articles that exhibits vastly superior heat and chemical resistance. This sealant, identified below as Sealant C, is of a composition analyzed as including 28% hydroxy propyl methacrylate, 28% triethylene glycol dimethacrylate, 15% unsaturated polyester and 28% dicyclopentenyloxyethyl methacrylate. Heat and chemical resistance characteristics of Sealant C are as follows:

| Sealant C | |
|---|---|
| Heat Resistance Test | 7.02% weight loss |
| Chemical Resistance Test | |
| (a) Water | 4.86% weight gain |
| (b) Brake fluid | 5.29% weight gain |
| (c) Antifreeze | N.C.* |
| (d) Methanol alcohol | 6.31% weight loss |

*N.C. as reported above and in the following section (c) means there was no change in weight.

Sealant C has excellent performance characteristics and is one of the few commercial sealants useful for applications in which high levels of heat and chemical resistance are required or specified.

(c) Sealants of the Invention

The heat curable sealants of this invention are based upon a combination of selected polymerizable components, each combined within stated percentage ranges so as to yield high levels of heat resistance, chemical resistance and sealability, and yet provide these advantageous performance features without disadvantageous processing requirements and at a moderate cost to the end user.

The sealants of the present invention are similar in composition to Sealant C except that they include no more than 20% by weight of a polymerizable monofunctional methacrylate or acrylate monomer and up to about 60% by weight of a water emulsifiable unsaturated polyester. The discovery that reducing the amount of monofunctional methacrylate or acrylate monomer and increasing the amount of water emulsifiable unsaturated polyester would provide such superior sealability properties was completely unexpected.

The new sealants of the present invention exhibit the following performance characteristics:

(1) Heat resistance of less than about 5% weight loss, determined according to the Heat Resistance Test;
(2) Chemical resistance to water of less than about 10% weight gain, determined according to the Chemical Resistance Test;
(3) Chemical resistance to brake fluid of less than about 10% weight gain, determined according to the Chemical Resistance Test; and
(4) Chemical resistance to antifreeze of less than about 5% weight gain, determined according to the Chemical Resistance Test.
(5) Resistance to methanol alcohol of less than about 5% weight loss.

The new sealants provide these performance characteristics and also exhibit excellent processability in that they are readily washed or rinsed from metal articles after impregnation and prior to curing, do not flocculate in a curing tank, and in other respects so that they may be used to impregnate cast and powdered metal articles with the usual types of equipment in general use for impregnation. Last, but of primary significance to the end user of the metal articles, the new sealants provide excellent sealing of pores in cast metal articles and powdered metal articles and also provide unsurpassed heat and chemical resistance.

The present heat curable liquid sealants include a polymerizable monofunctional and polyfunctional methacrylate or acrylate esters. (All of the percentages expressed in this description and in the claims are on a percent by weight basis.) These types of compounds have been demonstrated over a long period of years to be useful as components of liquid sealants, and one or more are included in the prior art sealants described in part (b) above. However, the sealants of the present invention are unique because they may include large amounts (i.e., at least 20% by weight) of a water emulsifiable unsaturated polyester.

The preferred sealants of the present invention have the following composition:

Component (1): about 0% to no more than about 20% of hydroxy propyl methacrylate, a polymerizable monofunctional methacrylate;

Component (2): about 20% and up to 40% of triethylene glycol dimethacrylate, an alkylene glycol dimethacrylate;

Component (3): about 10% to about 30% of a dicyclopentenyloxyethyl methacrylate, a difunctional methacrylate;

Component (4): about 0% to about 25% of a polymerizable polyfunctional dimethacrylate or diacrylate ester of diethylene glycol; and Component (5): about 15% to about 60% of a water emulsifiable unsaturated polyester.

With respect to the monofunctional methacrylate/acrylate monomer, component (1), it has been found that including more than about 20% thereof in the sealant may result in rapid and significant deterioration of heat resistance. About 12% to about 18% of component (1) is an especially useful range for this component of the formulations.

Component (3) is about 10% to about 30% of a difunctional methacrylate or acrylate monomer, such as polymerizable dicyclopentenyloxyethyl methacrylate or dicyclopentenyloxyethyl acrylate monomer. It has been found that the presence of at least about 15% of polymerizable component (3) results in substantial improvement of heat resistance, i.e. reducing the heat loss of the cured sealant when determined according to the Heat Resistance Test. Including more than about 25% of polymerizable component (3) usually results in no significant improvement in heat resistance.

The water emulsifiable unsaturated polyester component (5) provides the desired level of sealability. If less than about 50% of the polyester is used it results in a rapid decrease in sealability, and more than about 60% yields no increase in sealability but results in a dramatic increase in viscosity that causes drag-out and washing or rinsing problems. About 20% to 50% of the polyester is particularly useful for most sealants. However, for some applications it is advantageous to use sealants containing the higher levels of polyester.

To summarize the foregoing, the new liquid sealants of the invention include the following polymerizable components:

(1) monofunctional methacrylate or acrylate monomer, about 0% to no more than about 20%, preferably about 0% to 18%;

(2) an alkylene glycol dimethacrylate or diacrylate monomer ester of alkylene glycol, at least about 20% to 40%, preferably about 15% to 40%;

(3) dicyclopentenyloxyethyl methacrylate or dicyclopentenyloxyethyl acrylate monomer, about 10% to 30%, preferably 15% to 25%;

(4) Diethylene glycol dimethacrylate, about 0% to about 25%, preferably about 0% to about 20%; and (5) water emulsifiable unsaturated polyester, about 15% to 60%, preferably about 20% to 55%.

Representative of the polymerizable monofunctional methacrylate and acrylate monomers suitable for component (1) of the above sealant compositions are monomers of the type formula

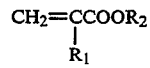

in which $R_1$ is H or $CH_3$, and $R_2$ is $C_nH_{2n+1}$ or $C_nH_{2n}OH$ in which n is an integer of 1 to about 20, preferably 2 to 12. Exemplary monomers of the above type formula are methyl methacrylate, ethyl methacrylate, propyl methacrylate, isobutyl methacrylate, methyl acrylate, butyl acrylate, hydroxypropyl methacrylate, hydroxypropyl acrylate and lauryl methacrylate. Especially preferred hydroxypropyl methacrylate. Compounds of this type are available commercially from a number of chemical companies.

Representative of alkylene glycol dimethacrylate or diacrylate monomer ester of an alkylene glycol suitable for component (2) of the above compositions are the dimethacrylate and diacrylate esters formed by the reaction of methacrylic acid or acrylic acid, or their anhydrides, and an alkylene glycol. Exemplary monomers of this type include triethylene glycol dimethacrylate. Compounds of this type are commercially available from a number of chemical companies. The triethylene glycol dimethacrylates also may be supplied in combination with the unsaturated polyester, component (5), as described hereafter.

Component (3) of the above sealant compositions is dicyclopentenyloxyethyl methacrylate or acrylate which is of the type formula

in which $R_1$ is H or $CH_3$. Compounds of this type are available commercially from Rohm and Haas under their trade names Rocryl® 57,672 and 657T and consist of high molecular weight liquids (MW=262, 248 and 262 respectively) with a specific gravity of 1.064, 1.085 and 1.064 respectively.

The unsaturated polyester component (5) of the sealant compositions consists of a water emulsifiable unsaturated polyester resin which reacts with the acrylate monomers of components to form a cross-linked solid upon curing or polymerization of the liquid sealant. The preferred polyester is available commercially from Cook Composites & Polymers of Port Washington, Wisconsin under the trade name Stypol® XL072-5021. The specific composition of that product is not published, but analysis has shown that it is a polyester formed by the reaction of adipic acid 44% and fumaric acid 15% with a mixture of polyols including diethylene glycol. It contains 26% of triethylene glycol dimethacrylate and 22% unsaturated polyesters. Other suitable unsaturated polyesters are available from other manufacturers.

In addition to polymerizable components the sealants can and generally should include an inhibitor, when formulated for shipment to an end user. The inhibitor is included to prevent premature polymerization of the sealant and provide a stable sealant with acceptable shelf life. Suitable inhibitors include quinones, hydroquinones or phenols and substituted phenols. A small amount of inhibitor, such as about 0.01% to 2%, is sufficient; about 0.1% to 0.4% of inhibitor gives satisfactory results.

An optional element is a dye, preferably a fluorescent dye, to provide for visual inspection of cured sealant. The sealants may include from 0 to about 10 ppm of dye. Only a small amount is needed, such as about 0.01 to 0.05% or less. The preferred dye is Keystone Aniline Keyflour White PL.

A catalyst is mixed with the liquid sealants by the end user at the time a sealant is added to the impregnation tank or reservoir tank of impregnation apparatus. The sealant manufacturer will generally supply the user with a pre-measured quantity of catalyst appropriate for each drum or other quantity of sealant. Many catalysts are suitable, such as benzoyl peroxide, methyl ethyl ketone peroxide, alkyl peresters, cumeme hydroperoxide, or an azonitrile such as, for example, 2, 1'-azo bis (isobutyronitrile) identified herein as AZBN. The sealants need contain only a small amount of the selected catalyst, such as on the order of about 0.03% to 1%. Sealants of the invention have excellent pot life after a catalyst is added. The sealants can be cured with hot water at a temperature of about 190° F. to 200° F. in about 10 minutes to 20 minutes after being catalyzed, with preferred conditions being 15 minutes curing time with water at 195° F.

The following Examples present several exemplary sealants formulated in accordance with the present invention. In the Examples, the trade names and suppliers for certain compounds listed in the formulations are as follows:

(a) Stypol ® 72-5021, Cook Composites & Polymers;
(b) Rocryl ® QM57T, Rohm & Haas;
(c) Vazo ® 64, du Pont;
(d) Ralox ® BHT, Raschig Corp;
(e) Hostalux ® KCB, Hoechst Celanese; and
(f) Keystone Aniline Keyflour White PL dye.

EXAMPLE 1

Sealant 1 of the formulation set forth below was prepared by admixing the several ingredients with light stirring.

| Sealant 1 | |
|---|---|
| Component (1) hydroxypropyl methacrylate | 15% |
| Component (2) triethylene glycol dimethacrylate | 20% |
| Component (3) dicyclopentenyloxyethyl methacrylate[b] | 15% |
| Component (4) diethylene glycol dimethacrylate | 0% |
| Component (5) water emulsifiable unsaturated polyester[a] | 50% |
| Catalyst azobisisobutyronitrile[c] | .4% |
| Inhibitor butylated hydroxy toluene[d] | .1% |
| Dye fluorescent | <.1 |

Cured test bodies of Sealant 1 were subjected to the Heat Resistance Test and Chemical Resistance Test procedures described in section (a) with the following results.

| Heat Resistance Test | 6.77% weight loss |
|---|---|
| Chemical Resistance Test | |
| (a) Water | 10.74% weight gain |
| (b) Brake fluid | 14.81% weight gain |
| (c) Antifreeze | 6.48% weight gain |
| (d) Methanol alcohol | 4.30% weight loss |

EXAMPLE 2

Sealant 2 of the formulation set forth below was prepared by admixing the several ingredients with light stirring.

| Sealant 2 | |
|---|---|
| Component (1) hydroxypropyl methacrylate | 0% |
| Component (2) triethyleneglycol dimethacrylate | 40% |
| Component (3) dicyclopentenyloxyethyl methacrylate[b] | 25% |
| Component (4) diethylene glycol methacrylate | 20% |
| Component (5) water emulsifiable unsaturated polyester[a] | 15% |
| Catalyst azobisisobutyronitrile[c] | .4% |
| Inhibitor butylated hydroxy toluene[d] | .1% |
| Dye fluorescent | <.1% |

Cured test bodies of Sealant 2 were subjected to the Heat Resistance Test and Chemical Resistance Test procedures described in section (a) with the following results.

| Heat Resistance Test | 3.59% weight loss |
|---|---|
| Chemical Resistance Test | |
| (a) Water | 1.87% weight gain |
| (b) Brake fluid | 1.02% weight gain |
| (c) Antifreeze | 1.01% weight gain |
| (d) Methanol alcohol | 1.82% weight loss |

The heat and chemical resistance data reported above for Examples 1-2 demonstrate that the new sealants of the present invention meet high performance characteristics in that they exhibit low heat loss when subjected to the Heat Resistance Test and low weight gain or loss when tested with respect to water, brake fluid, antifreeze and methanol alcohol determined according to the Chemical Resistance Test. Specific formulations of Sealants 1-2 of these examples meet the performance objectives as to each of these tests that are characteristic of the sealants of the present invention, to wit:

(1) Weight loss of less than about 15% when subjected to the Heat Resistance Test;
(2) A weight gain of less than about 10% in water as determined according to the Chemical Resistance Test;
(3) A weight gain of less than about 5% in brake fluid as determined according to the Chemical Resistance Test; and
(4) A weight gain of less than about 5% in antifreeze as determined according to the Chemical Resistance Test.

With respect to the specific formulations set forth in Examples 1 & 2, the viscosity of each sealant is as follows:

| | |
|---|---|
| Sealant 1 | 530 seconds; |
| Sealant 2 | 30 seconds. |

(d) Sealability Tests

As demonstrated by the data concerning heat and chemical resistance presented in section (c), the new sealants of the present invention have demonstrably superior properties in these respects as compared to prior art Sealants A, B and C. The superior nature of Sealants 1 and 2 in connection with these properties indicate the sealants have attractive characteristics for impregnating many different types of porous metal articles, but the new sealants also are capable of effectively sealing the pores in metal articles. The information described in this section (d) demonstrates the efficacy of Sealants 1 and 2 with respect to sealability.

The sealability testing reported herein was conducted in accordance with the procedure of MIL-I-17563B, which sets forth a detailed procedure for testing the sealability of sealants for metal articles. The test specimens as required by this procedure consisted of powdered brass metal sintered or fused together to form porous metal cylindrical articles one inch long with a one inch outside diameter and a 0.75 inch inside diameter, i.e. a one inch diameter cylinder with a 0.75 inch longitudinal bore along its central axis. The test specimens had a void volume of at least 18%, also determined according to MIL-I-17563B.

All of the impregnated test specimens described in this section (d) were impregnated according to the following procedure. (1) The specimens were subjected to a dry vacuum cycle for 20 minutes at 1.5 to 2 Torr vacuum to allow escape of air entrapped in the pores or voids of the specimens. (2) The test specimens were then submerged in the respective sealants for 20 minutes at 1.5 to 2 Torr vacuum. (3) While still submersed in the sealants, the specimens were subjected to a pressure cycle for 20 minutes at 100 psi (6.8 atmospheres). (4) Following step 3, the impregnated specimens were drained for 15 minutes to allow excess sealant to drain from the surface of the specimens. (5) Next, the specimens were subjected to a light rinse cycle during which they were washed with water at room temperature for 15 seconds. (6) Last, the impregnated specimens were subjected to a water cure cycle in which the specimens were submersed in water heated to 195° F. for a period of 10 minutes to polymerize the various sealants. The specimens were subjected thereafter to the pressure testing for detection of leakage as described in the next paragraph.

The apparatus for pressure testing of unimpregnated and impregnated test specimens includes a manifold at the bottom of a tank partially filled with water. Gas under pressure, nitrogen gas in this instance, is fed through a hose and valve to one end of the manifold. The hollow cylindrical brass powdered metal test specimens are placed on the manifold with their bottom end seated on an O-ring seal carried within a circular groove in the manifold and the specimens are retained in the desired position by short vertical pins. Four test specimens are accommodated on the manifold in this manner. A rubber gasket is seated on the top end of a specimen, and the metal plate of a vertical clamp engages the top of the gasket. The clamp is tightened to hold each specimen firmly in place and provide a gas-tight seal at the top and bottom ends of the specimen. Nitrogen gas at a pressure of 50 psi, is fed into the longitudinal internal bore of a test specimen and leakage is determined by observing the extent to which gas escapes through the wall of a specimen; the specimens are submerged in water during this procedure so that the bubbles of gas escaping through the wall will be visible. A black background is positioned in the tank behind the specimens to enhance visibility of bubbles of gas.

Test specimens which have not been impregnated with any type of sealant demonstrate the leaking of copious quantities of nitrogen, thereby demonstrating the high porosity of the test specimens.

The test specimens after impregnation with prior art Sealants A and B leak substantial quantities of nitrogen being fed at 50 psi into the internal bore of each specimen. Both Sealant A and Sealant B are unable to completely seal the pores in the test specimens and both Sealants A and B fail to meet the requirements of MIL-I-17563B. A test specimen impregnated with prior art Sealant C almost completely seals the pores in the test specimen. Sealant C is one of the few sealants to meet the requirements of MIL1-17563B. The sealants of the invention also pass the requirements of this MIL test.

The sealants of the invention exhibit vastly improved sealability as compared to prior art Sealant A and Sealant B. This improvement in sealability is clearly evidenced by the substantial reduction in the flow of gas bubbles through the test specimens impregnated with Sealants 1 and 2 as compared to the same test specimens impregnated with Sealants A and B. The sealability of the sealants of the invention also is better than the sealability of prior art Sealant C.

(e) Conclusion

The foregoing detailed description of thermally curable liquid sealants for impregnating and sealing pores and voids in cast metal articles and powdered metal articles sets forth new and useful sealants that meet high performance standards as to heat and chemical resistance. End users now have available sealants of these characteristics that are of low to moderate cost and substantially outperform prior art sealants of the same cost. The new sealants can be employed in various types of impregnating machines now commonly in use, so that neither machine modifications nor special equipment are required, no special processing steps as to washing are required, and the cure water does not need to be filtered as the sealants have lower viscosities resulting in much less contamination of cure water. Conversely, however, the cure water can be filtered, which allows the operator to re-use the cure water without contaminating the inhouse water supply or the sanitary sewer system. In addition, rinse water containing sealants of the invention can be treated, such as by settling in a holding tank or mechanically, to remove suspended solids, following which the water can be re-used.

The sealants of the present invention provide exceptional performance capabilities with respect to chemical and physical properties that may be of critical importance to end users. The foregoing enabling description of the present invention is made in such full and complete detail as to enable those of ordinary skill in the art to understand and practice the invention, but it is anticipated that those skilled in the art will be able to devise changes to the described embodiments that will remain within the true spirit and scope of this invention.

I claim:

1. A thermally curable sealant comprising by weight:
   (a) about 15% of hydroxypropyl methacrylate;

(b) about 20% of triethylene glycol dimethacrylate;
(c) about 10% to about 15% of dicylopentenyloxyethyl methacrylate; and
(d) about 50% of a water emulsifiable unsaturated polyester.

2. A thermally curable sealant comprising by weight:
(a) about 40% of triethyleneglycol dimethacrylate;
(b) about 25% of dicylopentenyloxyethyl methacrylate;
(c) about 20% of diethyleneglycol dimethacrylate; and
(d) about 15% of a water emulsifiable unsaturated polyester.

* * * * *